United States Patent [19]

Kumagai

[11] Patent Number: 5,077,808

[45] Date of Patent: Dec. 31, 1991

[54] METHOD FOR PROCESSING AN IMAGE BY HISTOGRAM ALTERATION

[75] Inventor: Ryohei Kumagai, Tokyo, Japan

[73] Assignee: Ezel Inc., Tokyo, Japan

[21] Appl. No.: 347,035

[22] Filed: May 4, 1989

[30] Foreign Application Priority Data

May 16, 1988 [JP] Japan .................. 63-118565

[51] Int. Cl.$^5$ .................................. G06K 9/46
[52] U.S. Cl. ................................ 382/18; 382/51
[58] Field of Search .............. 382/18, 51; 358/166

[56] References Cited

U.S. PATENT DOCUMENTS

| | | | |
|---|---|---|---|
| 3,805,239 | 4/1974 | Watanabe | 382/51 |
| 4,695,884 | 9/1987 | Anastassiou | 382/51 |
| 4,731,863 | 3/1988 | Sezan et al. | 382/51 |
| 4,742,551 | 5/1988 | Deering | 382/51 |
| 4,791,678 | 12/1988 | Iwase et al. | 382/51 |

*Primary Examiner*—David K. Moore
*Assistant Examiner*—Jose L. Couso

*Attorney, Agent, or Firm*—Cushman, Darby & Cushman

[57] ABSTRACT

An image processing method for flattening histogram with distribution comprising steps of:

a density conversion table is generated for indicating to which densities each density is to be converted, as well as how many pixels are to be converted;

the latter of the density is registered in an address designated by the former of the density in a converting circuit, and the number of pixels to be converted is registered in a count-down circuit;

density of each pixel of an image is inputted to the converting circuit and the count-down circuit so that latter of the density is outputted from the converting circuit and that the number in an address designated by the density of each pixel is decreased by "1" on each input of the density;

the density of each pixel is converted to the former density until the number is decreased to "0"; and pixels in the image of the density which corresponds to the number decreased to "0" is converted to an index density thereafter.

6 Claims, 3 Drawing Sheets

FIG. 3

| DENSITY | DENSITY TO WHICH A DENSITY IS TO BE CONVERTED | NUMBER OF PIXELS TO BE CONVERTED |
|---|---|---|
| $d_1$ | $c\, d_{11}$ | $n_{11}$ |
|  | $c\, d_{12}$ | $n_{12}$ |
| $d_2$ | $c\, d_{21}$ | $n_{21}$ |
| ... ... ... | ... ... ... | ... ... ... |
| $d_k$ | $c\, d_{K1}$ | $n_{k1}$ |
| ... ... ... | ... ... ... | ... ... ... |
| $d_N$ | $c\, d_{N1}$ | $n_{N1}$ |

METHOD FOR PROCESSING AN IMAGE BY HISTOGRAM ALTERATION

FIELD OF THE INVENTION

The present invention relates to an image processing method for flattening histogram with distributing pixels of one density to two or more densities.

BACKGROUND OF THE INVENTION

In the flattening histogram with distributing pixels to one or more densities, a complex processing is necessary that a part of number of pixels in one density is moved and added to number of pixels of one or more other densities. In the conventional method such complex processing seemed to be performed by MPU. It took long time of several minutes for processing histogram flattening of an image of 512×512×8 bit, in the conventional method.

SUMMARY OF THE INVENTION

The present invention has an object to provide an image processing method for processing histogram flattening with distributing number of pixels by a simple hardware in high process speed.

According to the present invention, a converting circuit is used for storing densities to which number of pixels is partially moved from one density which is designated as an address of the converting circuit for the above storaging. A count down circuit is used for storaging number of pixels to be moved of each density and for decreasing the number by "1" on every moving. The moving is performed until each number is decreased to "0" in the count-down circuit.

BRIEF DESCRIPTION OF DRAWINGS

FIG. 3 shows a table for converting densities;

PREFERRED EMBODIMENT OF THE PRESENT INVENTION

Exemplary preferred embodiments of the present invention will be described in detail hereinafter.

Figure 1:
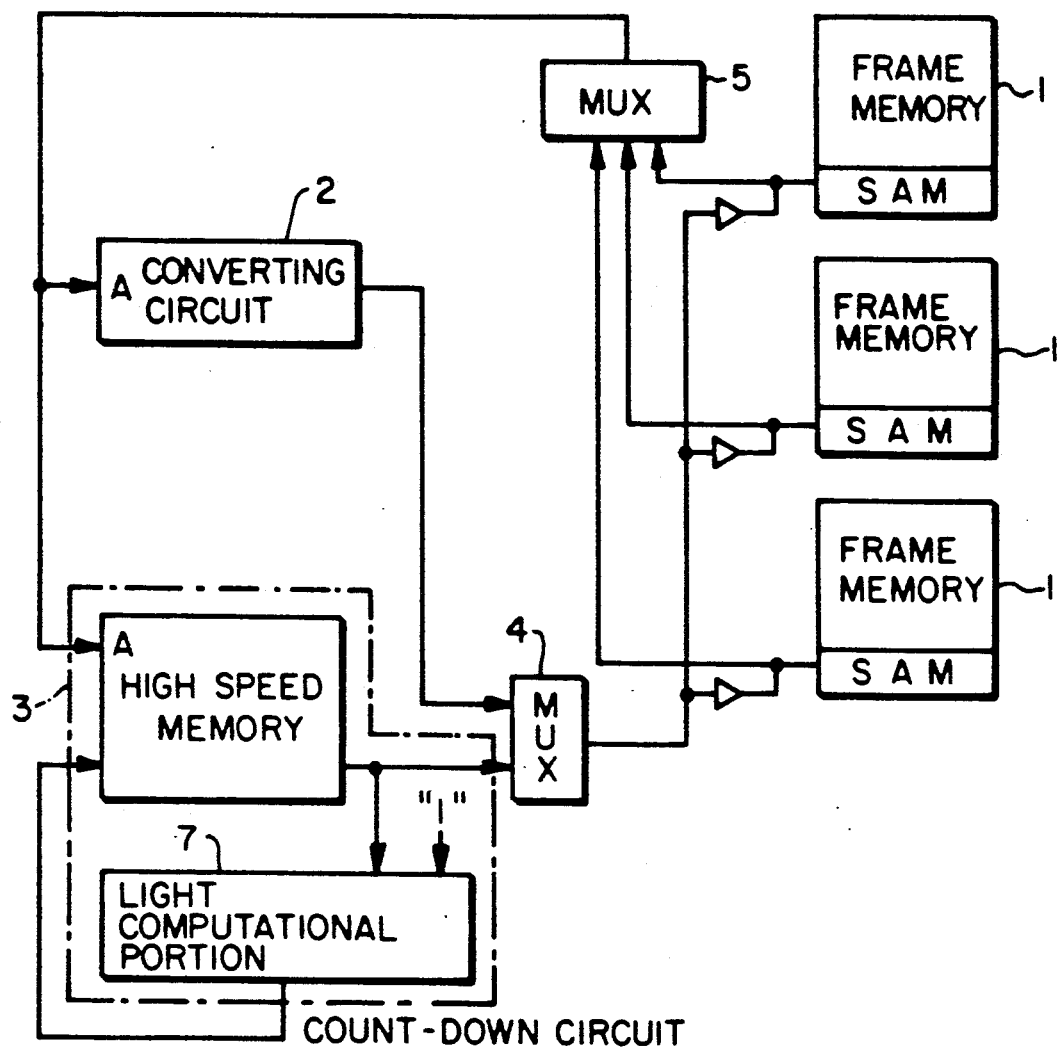
FIG. 1 is a block diagram of an image processing system used for the first embodiment of the present invention.
Figure 2:
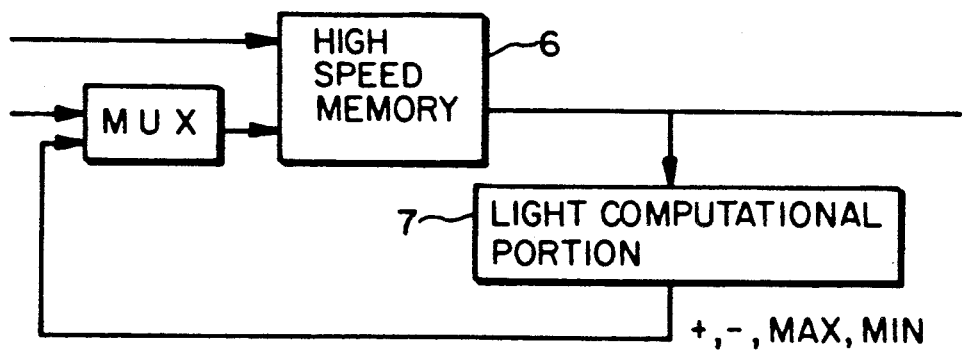
FIG. 2 is a block diagram of an variation of count-down circuit of the image processing system.

In FIG. 1, an image processing system for an embodiment of the present invention comprises a plurality of frame memories 1, a converting circuit 2 and a count-down circuit 3, to which circuits an image data is inputted from one of the frame memories 1. The outputs of the circuits 2 and 3 is inputted through a multi-plexer to one of the frame memories 1.

The outputs of the frame memories 1 are selected by a multi-plexer 5 so that the output of one of the frame memories is selectively inputted to the circuits 2 and 3.

The count-down circuit 3 comprises a high speed memory 6 and a light computational portion 7 to which the output of the high speed memory 6 is inputted. The high speed memory 6 comprises a static RAM (random access memory) or any other high speed memory. The output of the light computational portion 7 is inputted to a data input of the high speed memory 6 so that data in an address is calculated then again stored in the same address. In this embodiment, the light computational portion 7 is defined as subtracter for subtracting the inputted data by "1" and for storaging the subtraction result in the same address.

The converting circuit 2 comprises a high speed memory for storing density to which number of pixels of another density is partially moved.

The address where the density storaged is designated by the density from which the number of pixels is partially moved.

The density storaged is called "converting density" hereinafter. By making the converting circuit in read mode and inputting pixel data (density) to an address input of the converting circuit 2 from the frame memory 1, the converting density is outputted to which inputted density is converted. The converting density is written in the address of the frame memory, from where the inputted pixel data, is read out so as to generate an image, histogram of which is converted.

In the count-down circuit 3, number of pixels of a density to be converted to another density is storaged in an address designated by the density of the former. The number in an address of the circuit 3 is decreased by "1" on every conversion of one pixel of the density. The decreasing is performed by the light computational portion 7. When a number in an address is decreased down to "0", the number is not decreased thereafter. For preventing the decreasing for a density, data writing of the density (address) is prevented or decrement value in the light computational portion for the density is changes to "0", or any other manners can be applied. When the number of a density becomes "0", the density conversion of the density should not be performed thereafter. So the multi-plexer 4 is controlled so that the number "0" storaged in the high speed memory is written in the frame memory 1. The number "0" is an index indicating that the pixel is not converted in the histogram, in this case. The density for the index can be any other density not included in the image. In the above processing, number of pixel of one density is partially moved to another density. For partial distribution of number of pixels to other densities, only indexed pixels are processed in the same manner as the above. When number of pixels of one density is distributed to 3 densities, 3 times scanning of an image is necessary.

The count-down circuit 3 performs various calculations by defining the calculation manner of the light computational portion. The calculation manner may be addition, MAX, MIN etc. This enables counting-up, maximum extraction, minimum extraction etc. When the data outputted from the high speed memory is directly outputted without calculation in the light computational portion, the count-down circuit can be used as a converting circuit. When the light computational portion is defined as an adder and the density of each pixel is inputted to the address input of the high speed memory 6, a histogram is easily generated. In this processing, the light computational portion increases the data outputted from the high speed memory by "1" so as to count the number of pixels of each density. Before the flattening of the histogram, histogram is naturally generated. An adder with a performance of complement generation can be used as a subtracter. So a light computational portion of such a type can be easily changed in calculation manner.

From a histogram, a table can be generated as shown in FIG. 3. This table is called "density converting table" hereinafter. There are indicated in the table, to which density a density is to be converted, and how many pixels of each density are to be converted. In FIG. 3, each density is indicated by $d_1$ to $d_N$, densities to which the densities $d_1$ to $d_N$ are to be converted are indicated by $cd_{ij}$. The number of pixels to be converted from each density is indicated by $n_{ij}$. As for the density $d_1$, $n_{11}$ pixels are to be converted to the density $cd_{11}$ and $n_{12}$ pixels are to be converted to the density $cd_{12}$. In the first scanning, the conversion from $d_1$ to $cd_{11}$ is performed. When $n_{11}$ times conversion is finished, the data in the address $d_1$ of the high speed memory becomes "0".

Thereafter, pixels of density $d_1$ are changed to the index density of "0". In the second scanning, data $cd_{12}$ is registered in the address $d_1$ of the converting circuit, data $n_{12}$ is registered in the address $d_1$ of the high speed memory 6. By the processing similar to that of the first scanning, rest of the pixels of density $d_1$ are converted to the density $cd_{12}$. Therefore, maximal number of densities to which a density is converted defines the total scanning times.

When a dual-port memory is used for the frame memory 1 in the circuit as well as the total system is constructed as a pipe-line system in FIG. 1, the process speed will become about 1/30 (sec/frame) for an image of 512×512×8 bit. 30 times scanning will be performed in 1 sec.

Figure 4:
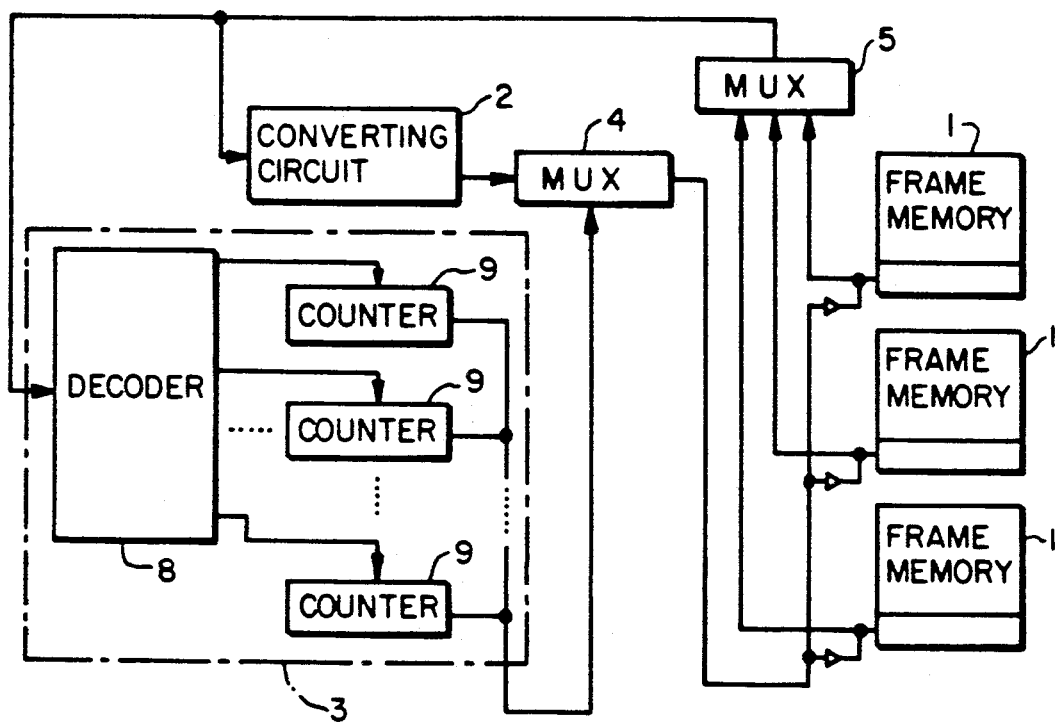
FIG. 4 shows a block diagram of another image processing system.

FIG. 4 shows another embodiment of the image processing system, which is different only in the count-down circuit from that of the system in FIG. 1. Therefore, portions are designated by the same references as that in FIG. 1.

The count-down circuit 3 in FIG. 4 comprises a decoder 8 and a counter 9 in which the number of pixels to be converted are registered. The counter 9 is provided for each density, or the number of counters 9 is more than the number of densities. Each counter 9 is connected to different output of the decoder 8 from each one another. The decoder 8 enables one counter 9 to output data registered, as well as decrease the data by "1" therein. The output of each counter 9 is transmitted to a multiplexer 4 which is connected to the data output of the converting circuit 2. When the output "0" is transmitted to the multi-plexer 4 from a counter 9, the multi-plexer 4 prevents the output of the converting circuit 2 from passing therethrough. By this construction, the performance similar to that of the circuit in FIG. 1 can be obtained.

Although only a few exemplary embodiments of this invention have been described in detail above, those skilled in the art will readily appreciate that many modifications are possible in the exemplary embodiments without materially departing from the novel teachings and advantages of this invention.

Accordingly, all such modification are intended to be included within the scope of this invention as defined in the following claims.

What is claimed is:

1. An image processing method for flattening a histogram distribution comprising steps of:

storing an image as pixel densities in an image memory;

generating a density conversion table for indicating to which conversion densities each image density is to be converted;

storing said conversion densities in addresses designated by said image densities in a converting circuit;

storing numbers of pixels to be converted in a count-down circuit;

inputting image densities of pixels of an image to said converting circuit and said count-down circuit so that said converting circuit outputs conversion densities and so that stored numbers of pixels to be converted are decreased by "1" on each input of each of said image densities;

converted pixels of said image densities to said conversion densities until said stored numbers are decreased to "0"; and converting pixels in said image of said image density which correspond to a number decreased to "0" to an index density thereafter.

2. An image processing method according to claim 1, wherein said count-down circuit comprises a high speed memory having an address input connected to the data output of said frame memory and comprising a light computation portion having an input which is connected to a data output of said high speed memory as well as having an output connected to a data input of said high speed memory.

3. An image processing method according to claim 2, wherein said light computational portion is defined as a subtracter.

4. An image processing method according to claim 1, wherein said count-down circuit comprises a decoder and a plurality of counters, said decoder designating one of said counters according to density of each of said pixels so as to decrease data in said counter.

5. A method for processing an image by histogram manipulation comprising the steps of:

sampling an image;

storing pixel densities of the image in a first memory;

creating a transformation table indicating first and second conversion densities c11,c12 to which a first pixel density d1 is to be converted and indicating numbers of pixels n11,n12 which are to be converted from the first pixel density d1 to first and second conversion densities c11, c12;

reading pixel densities stored in the first memory;

for a first number of pixels n11 having the first pixel density d1, converting the pixel density d1 to the first conversion density c11;

for a second number of pixels n12 having the first pixel density d1, converting the pixel density d1 to a second conversion density c12;

storing the converted pixels in a memory;

wherein the step of converting a number of pixels n11 having first pixel density d1 to the first conversion density c11 comprises steps of:

storing the first conversion density c11 in a conversion memory in a storage location accessed when first pixel density data d1 is applied as an address input;

storing the number of pixels n11 to be converted from the first pixel density d1 to the first conversion density c11 in a counter memory in a storage location accessed when first pixel density data d1 is applied as an address input;

reading pixel densities from the first memory;

simultaneously addressing the conversion memory and the counter memory with density data from the first memory, reading conversion density from the conversion memory;

decrementing a number of pixels to be converted in the counter memory; and reading additional pixel density data from first memory, simultaneously applying pixel density data to the conversion memory and to the counter memory until the number of pixels to be converted in the counter memory decrements to a reference value.

6. A method for processing an image by histogram manipulation comprising the steps of:

sampling an image;

storing pixel densities of the image in a first memory;

creating a transformation table indicating first and second conversion densities $c_{11}, c_{12}$ to which a first pixel density $d_1$ is to be converted and indicating numbers of pixels $n_{11}, n_{12}$ which are to be converted from the first pixel density $d_1$ to first and second conversion densities $c_{11}, c_{12}$;

reading pixel densities stored in the first memory;

for a first number of pixels $n_{11}$ having the first pixel density $d_1$, converting the pixel density $d_1$ to the first conversion density $c_{11}$;

for a second number of pixels $n_{12}$ having the first pixel density $d_1$, converting the pixel density $d_1$ to a second conversion density $c_{12}$;

storing the converted pixels in a memory;

creating a transformation table indicating a plurality of conversion densities $c_{ij}$ to which a plurality of pixel densities $d_i$ are to be converted and indicating numbers of pixels $n_{ij}$ which are to be converted from each pixel density $d_i$ to each respective conversion densities $c_{ij}$;

reading image pixel densities stored in the first memory;

for first numbers of pixels $n_{i1}$ having pixel densities $d_i$, converting the pixel densities $d_i$ to respective conversion density $c_{i1}$;

for second numbers of pixels $n_{i2}$ having pixel densities $d_i$, converting the pixel densities $d_i$ to respective conversion density $c_{i2}$; and storing the converted pixels in a memory.

* * * * *